United States Patent [19]

Vogt

[11] Patent Number: 4,763,147
[45] Date of Patent: Aug. 9, 1988

[54] SPECIAL PURPOSE CAMERA

[76] Inventor: Philippe Vogt, Frohalpstrasse 65, CH-8038 Zurich, Switzerland

[21] Appl. No.: 9,614

[22] PCT Filed: Aug. 23, 1984

[86] PCT No.: PCT/CH84/00135
§ 371 Date: Apr. 24, 1985
§ 102(e) Date: Apr. 24, 1985

[87] PCT Pub. No.: WO85/01124
PCT Pub. Date: Mar. 14, 1985

Related U.S. Application Data

[63] Continuation of Ser. No. 731,949, Apr. 24, 1985, abandoned.

[30] Foreign Application Priority Data

Aug. 25, 1983 [CH] Switzerland ............... 4626/83

[51] Int. Cl.[4] .................. G03B 5/06; G03B 5/08; G03B 19/10
[52] U.S. Cl. .................. 354/160; 354/189
[58] Field of Search .................. 354/160, 189, 289.1, 354/289.12

[56] References Cited

U.S. PATENT DOCUMENTS 3,479,945 11/1969 Koch .................. 354/160
3,825,938 7/1974 Koch .................. 354/160

FOREIGN PATENT DOCUMENTS 332829 11/1958 Switzerland .
434772 10/1967 Switzerland .

Primary Examiner—Michael L. Gellner
Attorney, Agent, or Firm—Handal & Morofsky

[57] ABSTRACT

The displacement devices (17, 23: 17', 23') and the orientation hinges (21, 26: 21', 21') of the lens holder body and of the image holder body (11 resp. 12) cooperate with electric emitters (36, 35, 38, 29: 36', 27', 28', 29') of which the output signals are provided to an electronic circuit (45). The circuit comprises intermediary memories for said output signals, as well as at least one unit for comparing the contents of the intermediary memories associated to the measuring emitter corresponding to the lens holder body and to the image holder body. When two memorized values which have been compared are within a predetermined tolerance range the circuit provides an output signal which energizes an optical or acoustic signal device (46). The present invention enables to transmit motions and orientations of the focal plane (31) with higher accuracy than before and without the need of scales of the objective holder (27).

20 Claims, 1 Drawing Sheet

SPECIAL PURPOSE CAMERA

This application is a continuation of application Ser. No. 731,949, filed Apr. 24, 1985, abandoned.

DESCRIPTION

1. Technical Area of the Invention

The present invention relates to a special purpose camera having a supporting rail on which a pair of holders are arranged for movement independently from each other in the longitudinal direction of the rail, and of which each comprises a carriage and a first joint for pivoting of the carrying arms about a vertical axis and a second joint or hinge for pivoting the objective or the picture holder about a horizontal axis.

The picture carrier may be in the form of a frosted glass disk or a photographic plate or a film.

2. State of the Art

Such cameras are preferably used by professional photographers since they enable the purposeful influencing of the perspective and sharpness by pivoting as well as displacing of the picture and the objective holders for maintaining the parallels, performing corrections of the picture details, tricks, etc. By pivoting the picture holder about a pair of mutually vertical axes, one may, for example, vary the distance between the objective and the individual regions of the picture plane and thereby the individual objects or portions of objects, which have different distances with respect to objective and/or are displaced sideways with respect to the optical axis of the objective camera can be imaged in an optimum sharp fashion. During the use of the camera it is common that after accomplishment of the presetting, the pivoting of the picture carrier are transposed onto the objective carrier width and then the picture carrier is reset again into its unpivoted initial position and, by displacing the picture carrier with respect to the objective carrier, the width of the picture is readjusted for an optimum imaging sharpness for all the picture portions, without the changing of the object width. For this reason the camera on its various joints or hinges and along the carrier or support rails is provided with scales as, on which the amount of the pivoting or displacement can be read. The above described operating manner has its advantage in that the perspective is not changed, and the set up difficulties associated with the pivoting of the objective will not occur due to the changes of the focus. Such operating fashion has, however, ascertained these advantages. The scales, especially on the hinges, for reasons of tight space, have a relatively small diameter and, therefore, a correspondingly coarse gradation, which effects the accuracy of the transposing of the pivoting of the joints on one of the holders onto the joints of the other holder. In addition the reading of the relatively inaccurate scale becomes even more difficult when the object to be photographed is illuminated brightly and the camera must be shielded against the bright light, and while a distance from the eye of the operating person is smaller than the distance to the object, this will pose and require a continuous and tiring accommodating of the eye.

THE INVENTION

It is, therefore, an object of the present invention, to provide a special purpose camera, which enables the transposing of the pivoting of the hinges of one carrier onto the hinges of the other carrier with a substantially higher accuracy, without interfering or tiring the operating person due to insufficient lighting or requiring continuous accommodation.

According to the invention such object is resolved with a special purpose camera of the above mentioned type camera, which is characterized in that each hinge and/or each carrier has a sensor associated therewith, which produces an electrical signal corresponding to the angle of rotation of the hinge or to the longitudinal displacement of the carriage on the carrier rail and furthermore by providing an electronic switching arrangement which processes such electrical signals and which produces an optical or acoustical indication, when the angle of rotation of at least one of the hinges of one holder corresponds to the angle of rotation of the corresponding hinge of the other holder and/or the sine of the angle of rotation of one of the hinges on the objective holder is equal to the ratio formed from the length of a displacement of the carriage of the picture holder along the carrier rail and from the distance between two parallel measuring lines on the picture holder and outside the picture center.

The special purpose camera according to the invention enables the pivoting of one of the carriers with hitherto to unavailable accuracy and its transposition onto the hinges of the other carrier. In addition, the transposition can be performed "blindly", that is, without the necessity that the operating person should read the scales, or without the necessity that without the transposition of the pivoting accordingly to the scale values he should make additional adjusting of the pivoting with the help of the frosted glass disk.

The special purpose camera according to the invention makes it possible also, that from both image distances which are necessary for a sharp imaging of two objects or parts of an object on an unpivoted picture plane and from the distance of the corresponding picture point vertical with respect to the pivoting axis, to calculate the angle by which the picture or the objective plane for a simultaneous sharp imaging of both picture points must be pivoted and to correspondingly set the pivoting.

Preferred embodiments of the special purpose camera according to the invention are recited in the appended claims.

In the following preferred embodiments of the special purpose camera according to the invention will be described with reference to the Figures, in which:

FIG. 1 is a schematic illustration of an embodiment of the special purpose camera according to the invention, FIG. 2 is a sketch illustrating the principle of an electronic circuit for processing the signals produced by the sensors of the two carriers, and FIG. 3 is a schematic illustration in a longitudinal section taken through the picture holder with the picture support for illustrating the calculations of a pivot angle from the displacement of the carrier and from the distance of two measuring lines on the frosted glass pane.

DESCRIPTION OF THE PREFERRED EMBODIMENT

Figures 1, 2, 3:
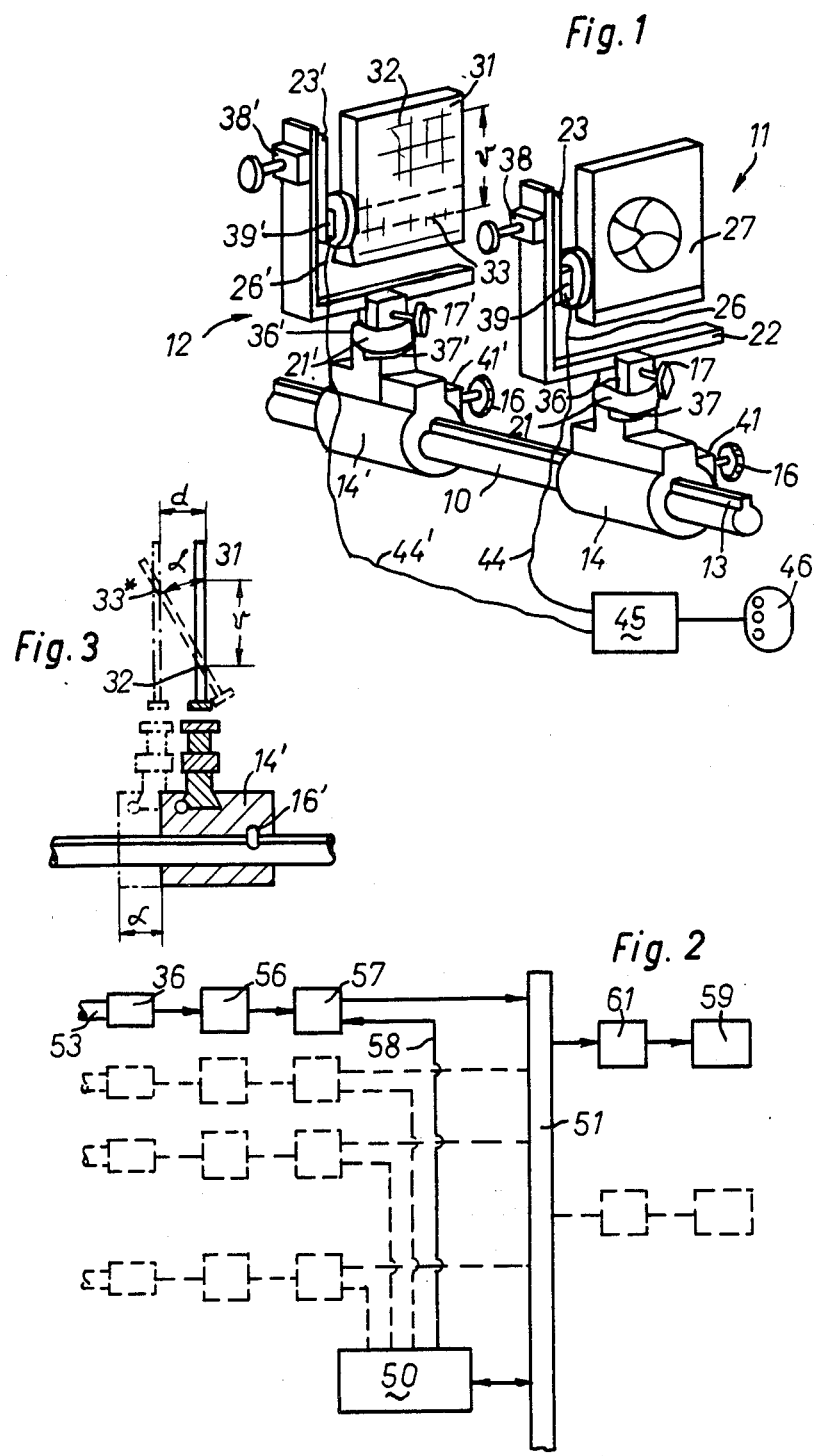

The schematically illustrated special purpose camera of FIG. 1 comprises a carrier rail 10 and an objective and a picture carrier 11, respectively, 12. The carrier rail is to be secured onto a stand or an optical bench which is not illustrated, and on which the positioning of the camera relative to the space coordinates, corresponding to the attempted picture taking, can be selected freely. On the carrier rail there is secured a toothed rack 13 running in the longitudinal direction.

The objective holder 11 can be displaced by means of a rotating knob 16, which cooperates with the toothed rack 13, along the carrier rail 10. On carriage 14 of the objective carrier there is provided a first pivoting hinge 21, the pivoting axis of which is directed transversely and, in the illustrated embodiment, vertically with respect to the carrier rail. Above this pivoting hinge a first displacing device 17 is secured by means of a guiding slot, which is formed preferably as a fine toothed drive and serves for the displacement of a carrying arm 22 transversely with respect to the longitudinal direction of the carrying rail. On the leg portions of the carrying arm which is bent at a right angle, and which is vertical in the Figure, a second displacing arrangement 23 is arranged. This second displacing arrangement is practically similar to the first displacing arrangement as to its structure. The toothed fine drive of the second displacing arrangement enables with the help of a rotating knob to displace the carrying arm in a vertical direction transversely with respect to the displacing arrangement. On the second displacing arrangement there is a second pivoting joint 26 secured for the objective holder 27, and the axis of which is directed transversely with respect to the axis of the first pivoting hinge and, in the illustrated embodiment, it is directed horizontally.

The picture holder 14' is practically similarly constructed as the above as described objective holder. For this reason the individual structural elements and groups of such elements of the picture holder as well as their arrangement with respect to each other will not be repeated here, and for simplification they will be identified with singular reference characters as the corresponding elements of the objective holder and in order to still provide a distinction over the earlier reference characters, they will be given an apostrophe.

In contrast to the objective carrier 27, the picture carrier or holder is provided with a frosted glass pane 31, on which several measuring lines lying outside the picture center are engraved or printed, which relate to different setting bases.

Each of the displacing arrangements and each of the pivoting hinges has an electrical sensor associated therewith. The first displacing arrangements 17,17' operate with the sensors 36,36', the first pivoting hinges 21 and 21' operate with the sensors 37,37', the second displacing arrangements 23 and 23' operate with the sensors 38,38' and the second pivoting hinges 26 and 26' operate with the sensors 39., 39', respectively. In addition, at least the rotating knob 16 with which the picture carrier 12 can be displaced along the carrier rail, has a sensor 41 associated therewith.

Each sensor is connected over a conductor with an electronic circuit 45, of which in order to provide a simplified overview, in the Figure only conductors 44,44' of the sensors 39,39' for the pivoting of the carrier arm 22,22' are shown. The electronic circuit controls a display device 46 which will be described hereinafter.

FIG. 2 illustrates the principle for a circuit arrangement of the first embodiment of the electronic circuit. This circuit comprises a microprocessor 50 to which a data bus 51 is coupled. For sensors in this embodiment precision potential meters 36 are used, which are operationally coupled directly or through a coupling member 53 with a positioning element of a displaying device or of a pivoting hinge. Each potential meter is coupled through a conductor to the input of an analog/digital transducer 56, through which an intermediate or buffer storage or memory 57 is coupled for the digital output signal. The intermediate memory is coupled by the data bus with the microprocessor. In addition between the data processor and each of the intermediate memories there is provided an individual conductor 58 for the reset signal.

Although in order to satisfy the illustration only one potential meter, one analog/digital transducer, one intermediate memory and their coupling is shown, it is understood that each displacing arrangement and each pivoting hinge, as well as on the objective and also on the picture carriers a group of such elements are provided, which fact is indicated by the dashed-line showing of those circuit portions.

This embodiment of the electronic circuit comprises further a liquid central display (LCD) or a light emitting diode (LED) 59, which are energized by a driver stage 61. It is possible to provide for each pair of the mutually associated displacing arrangements and pivoting hinges and indicating element, which fact is illustrated by the dashed-line indication of those circuit elements. It is also possible that one indicating element should be used, which will perform the indication one after the other, as to the pair of the displacing arrangement or pivoting hinges which have been displaced or pivoted by a similar magnitude.

It will be immediately recognized by an expert that in the above described circuit arrangement the sensors illustrated as potential meters can be replaced by a digital angle sensor. Instead of the A/D transducer 56 the angular sensors will be coupled to counters, the output of which will be coupled with an associate at intermediate memory 57. The intermediate memory serves, as indicated in the first embodiment, for the processing of the stored data and is coupled with the microprocessor or at data bus and for the clearing of the storage contents that is provided at individual conductor from the microprocessor to the intermediate memory.

For the indication of the corresponding setting of two mutually corresponding displacing arrangements or pivoting hinges, instead of the optical indicating elements described in connection with FIG. 2, one may use also a tone generator, for example, a buzzer. The buzzer will be energized by an amplifier stage, the signal input of which is coupled with the data bus. Also at this embodiment it is possible that each displacing arrangement and each pivoting hinge should have a buzzer associated therewith, or have one buzzer sequentially indicating the corresponding setting of the mutually associated devices and hinges.

The electronic circuit can be built up from commercially available elements. The selection of circuit elements which are best suitable for a predetermined mechanical construction of the special purpose camera and for the desired accuracy of adjustment is considered as a purely technical measure lying within the reach of an expert, therefore, the detailed description of such measures are intentionally omitted.

In using the special purpose camera, according to the invention, first the carrying rail 10 is directed in the direction of the object or objects to be photographed. Then the picture carrier 12 becomes displaced with respect to the objective carrier 11 along carrying rail in such a manner, until at least a portion of the object becomes imaged on the frosted glass pane 31 at least in the desired magnitude and the possibly sharpest manner. Thereafter (so far this is necessary) the frosted glass pane will be displaced with the help of the first or second displacing arrangements 17' and 23' in the horizontal, respectively, vertical directions, until the object to be photographed is imaged in the desired region of the frosted glass pane. The camera will be set to one image point which lies on the horizontal or vertical pivot axis of the picture plane. By rotating about the corresponding pivot axis it becomes also possible to sharply set to another point in the picture space and outside the pivot axis without losing the picture sharpness on the pivot axis.

According to the desired task the picture carrier must be pivoted vertically as well as horizontally until all portions of the object lying in different distance from the objective and in different side distance from the optical axis become imaged in an optimum sharp fashion.

After an optimum setting of the frosted glass pane, the pivoting and displacement thereof become transposed onto the corresponding vertical and horizontal pivoting hinges and of the displacing arrangements on the objective carrier. At the same time the pivoting angles and displacements obtained on the picture carrier they will be transposed in the opposite direction. As a result the sensors associated with each pivot joint and each displacing arrangement will produce corresponding electrical signals, which will appear thereafter at the output of the intermediate memory coupled thereto. The microprocessor will read the output signals of the intermediate memories and produces an energizing signal for one of the driving stages of the indicating arrangements, if the output signal of the intermediate memory of two manually associated displacing arrangements or pivoting hinges on the picture and on the objective carriers will lie in a predetermined tolerance region. The excited or energizer driving stage will control thereafter one of the signal generators connected thereto, which will produce an optical or an acoustical signal, which will indicate for the operating person and correspondence of the setting of both of the mutually associated displacing arrangements or pivoting joints.

When the pivoting have been transposed from the frosted glass pane onto the objective, then the frosted glass pane is returned and pivoted back into its original position. The sharpness of the image on the frosted glass pane can be optimized by the displacement of the picture carrier 12 relative to the objective carrier 11 without changing the distance between the objective and the object.

During the above described operating procedure for the transposing of the pivoting or the displacement of the frosted glass pane onto the objective no scales or similar devices had to be called upon which could have resulted in the disadvantages described earlier. The operating person can displace and pivot the objective carrier "blindly" until an optical or acoustical signal is produced, which indicates the correspondence between the setting of the objective to a selected setting reduced by hub of the frosted glass pane.

As can be seen from the illustration of FIG. 3, the electronic circuit can be used also for the compensation of the sharpness at various distances with the help of the measuring line pairs lying outside the picture center. To this effect the sign of the pivoting angle is calculated from the freely selected distance cap V of a measuring line pair and from the electronic signal produced from the sensor associated with the rotating knob 16', which will correspond to a displacement of the picture carrier and of the frosted glass pane by an amount D. By transporting of the setting value of the picture carrier onto the objective carrier, the latter will be pivoted until its pivot angle $\alpha$ will correspond to an angle calculated from the relationship sine $\alpha = d/V$ in a preferred embodiment the microprocessor has a memory associated therewith in which the various distances V are stored which enables the use of a frosted glass panes having measuring line pairs with different distances or spacings.

The described signals of the set up does not have to be followed necessarily in everyday practice. It is also possible to change the described embodiment of the special purpose camera of the invention and adjusted to special operating requirements. For example, it is not necessary to compare the electronic signals with the help of a microprocessor. In the event if analog signal pick-ups are used, the output signals of corresponding sensors can be compared with the help of a simple comparator circuit, which in the event of coincidence by the input signals, will produce an output signal. In such circuit arrangement for each pair of associated sensors one comparator circuit can be used, or a single comparator circuit can be also considered, the input of which is coupled with a switching device, which according to its position, will connect a pair of associated sensors with the input of the comparator. When using a microprocessor, a switching device can be provided whereby the microprocessor will compare only the output signals of a pair of associated sensors. It is also possible to sequentially read-out at high frequency, the intermediate storage device connected to the sensors, whereby the microprocessor practically compares simultaneously all the sensed signals which are to be compared. Also an additional storage device can be provided, in which the contents of the intermediate storage devices connected to the picture carrier are stored and, first the objective holder is set up, when the picture carrier or holder is returned and pivoted back to its rest position. Furthermore, it is also possible to transpose the above-described determination of the pivot angles about a horizontal axis from a displacement of the picture holder along the carrier rail into a determination of the pivot angles about a vertical axis, in a similar fashion.

In closing it is noted that the special purpose camera according to the invention comprises a bellow which, for the light-proof closure of the space between the objective holder and the picture holder, is secured on these two holders.

I claim:

1. An improved special purpose camera having a carrying rail (10) and a lens holder (11) and a picture holder (12) arranged for independently moving along the rail, each of which comprises a carriage (14,14') and a first hinge (21,21') for pivoting a carrying arm (22,22') about a vertical axis and a second hinge (26,26') for pivoting a lens frame (27) and a picture frame (31), respectively, about a horizontal axis, the improvement comprising means (41,41') associated with at least one carriage (14,14'), which means produces an electric signal corresponding to the longitudinal displacement of said carriage on the carrying rail, and further an electronic circuitry (45,46) having a microprocessor (50) for the processing of the electrical signal and for producing an optical signal when the sine of the pivot angle of one hinge on the lens frame is equal to the ratio formed from the length of the displacement of the carriage (14') of the picture holder (12) along the carrier rail (10) and from the spacing of two parallel measuring lines (32,33) on the picture carrier 931) and arranged outside the centre of the picture.

2. An improved special purpose camera having a carrying rail (10) and lens holder (11) and a picture holder (12) arranged for independently moving along the rail, each of which comprises a carriage (14,14') and a first hinge (21,21') for pivoting a carrying arm (22,22') about a vertical axis and a second hinge (26,26') for pivoting a lens frame (27) and a picture frame (31), respectively, about a horizontal axis, the improvement comprising means (37, 39, 41; 37', 39', 41') associated with each hinge (21, 26; 21', 26') and each carriage (14,14'), which means generates an electric signal corresponding to the pivot angle of each hinge and to the longitudinal displacement of each carriage on said carrying rail (10), and further an electronic circuitry (45,46) having a microprocessor (50) for processing the electric signals from said means and for generating an optical or acoustical signal when the adjustment of one holder corresponds to the adjustment of the other holder, said microprocessor (50) having a plurality of inputs divided into two groups, wherein one group is coupled with said means for said first and second hinge (21,26; 21',26') of one holder (11,12) and with said means for the corresponding carriage (14,14') of said holder, and the other group is coupled with said means for said first and second hinge (21', 26'; 21, 26) of the other holder (12, 11) and with said means for the corresponding carriage (14',14) of said holder and a plurality of outputs, each of which is associated with one of the inputs of one group and with the inputs of the other group for generating an output signal whenever on corresponding inputs a similar input signal is present.

3. Special purpose camera according to claim 2, characterized in that the holder (11,12) further comprise a first and a second displacing arrangements (17,23;17',23') for displacing the objective and picture holders (27,27') in the direction of the axes of both pivot hinges (21,26'21',26') and, that each of these displacing arrangements has a sensor (36,38;36',38') associated therewith, which produces an electrical signal corresponding to the displacement.

4. Special purpose camera according to claim 2, characterized potentiometers with an analog/digital transducer connected thereto.

5. Special purpose camera according to claim 2, characterized in that the sensors (36,37,38,39,41 . . . ) are constructed as digital angular sensors with a counter connected thereto.

6. The improvement of claim 2, wherein said means (36,38;36',38') of said first and second displacement arrangement are coupled with the corresponding group of inputs of said microprocessor (50).

7. The improvement of claim 2, comprising a third displacement arrangement (16,16') for displacing the lens holder (11) and the picture holder (12) along said carrying rail (10).

8. An improved special purpose camera having a carrying rail (10) and a lens holder (11) and a picture holder (12) arranged for independently moving along the rail, each of which comprises a carriage (14,14') and a first hinge (21,21') for pivoting a carrying arm (22,22') about a vertical axis and a second hinge (26,26') for pivoting a lens frame (27) and a picture frame (31), respectively, about a horizontal axis, the improvement comprising means (37,39,41;37',39', 41') associated with each hinge (21,26;21'26') and/or at least one carriage (14,14'), which means produces an electric signal corresponding to the pivot angle of a hinge, respectively to the longitudinal displacement of said carriage on the carrying rail, and further on electronic circuitry (45,46) having a microprocessor (50) for the processing of these electrical signals and for producing an optical or an acoustical signal when the pivot angle of at last one hinge on one of the carriers corresponds to the pivot angle of a corresponding hinge on the other carrier and/or the sine of the pivot angle of one hinge on the lens frame is equal to the ratio formed from the length of the displacement of the carriage (14') of the picture holder (12) along the carrier rail (10) and from the spacing of two parallel measuring lines (32,33) on the picture carrier (31) and arranged outside the centre of the picture, and further a first and a second displacing arrangement (17,23;17',23') for displacing the lens (27) and picture frame (31) in the direction of the axis of both pivot hinges (21,26;21',26') and that each of these displacing arrangements has means (36,38'36'38') for generating an electrical signal corresponding to the displacement.

9. Special purpose camera according to claim 8, characterized in that in the connecting conductor between each of the sensors (36 . . . ) and between the associated inputs of the microprocessor (50) there is provided an intermediate storage device (57).

10. Special purpose camera according to claims 8, characterized in that the longitudinal displacement of the picture holder (12') along the carrying rail (10) has a further sensor associated therewith (41') and that the microprocessor cooperates with a memory in which various spacings of measuring lines (32,33) are stored, and that the microprocessor produces an input signal corresponding to the sine of the pivot angle of the objective holder (27) is equal to the ratio formed from the longitudinal displacement of the picture holder (14') and from a predetermined stored spacing of a measuring line (V).

11. Special purpose camera according to claims 8, characterized in that for the optical indication of the correspondence of a displacement of the carriage (14,14') and/or of the pivoting of the carrying arms (22,22') resp., carriers (27,31) of both holders (11,12) each output of the microprocessor (50) has connected thereto a liquid crystal driving stage (61) and a liquid crystal indicator (59).

12. Special purpose camera according to claims 8, characterized in that for the acoustical indication of the correspondence of a displacement of a carriage (14,14') and/or pivoting of a carrying arm (22,22') resp., carrier (27,31) of both holders (11,12) each output of the microprocessor (65) has an amplifier and to the latter a tone generator connected thereto.

13. The improvement of claim 8, comprising a third displacement arrangement (16,16') for displacing the lens holder (11) and the picture holder (12) along said carrying rail (10).

14. The improvement of claim 8, wherein said means (36,37,38,39,41 . . . ) are potentiometers with an analogue/digital transducer connected thereto.

15. The improvement of claim 8, wherein said means (36,37,38,39,41 . . . ) are digital, angular sensors with a counter connected thereto.

16. The improvement of claim 8, wherein said microprocessor (50) has a plurality of inputs that are divided into at least two groups, of which one of the groups is coupled with the means (37,39;41) of the pivot hinges (21,26) of a carriage (14') and of the displacing arrangements (17,23) of the lens holder (11), and the other group is coupled with the means (37',39'41') of the pivot hinges (21',26') of a carrier (14) and of the disabling arrangements (17'23') of the picture holder (12) or vice versa, and comprising a plurality of outputs, each of which is associated with one of the inputs of one group and with the inputs of the other group for generating an output signal whenever on corresponding inputs a similar input signal is present.

17. The improvement of claim 16, wherein each output of the microprocessor (50) has connected thereto a liquid crystal driving stage (61) and a liquid crystal indicator (59) for the optical indication of the correspondence of a displacement of the carriage (14,14') and/or of the pivoting of the carrying arms (22,22"), respectively carriers (27,31) of both holders (11,12).

18. The improvement of claim 16, wherein each output of the microprocessor (65) has an amplifier and a tone generator connected to the outlet side for the acoustical indication of the correspondence of a displacement of a carriage (14,14') and/or pivoting of a carrying arm (22,22'), respectively carrier (27,31) of both holders (11,12).

19. The improvement of claim 8, wherein an intermediate storage means (57) is connected in the connecting conductor between the sensors (36 . . . ) and the associated inputs of the microprocessor (50).

20. The improvement of claim 8 wherein said microprocessor cooperates with a memory in which various spacings of measuring lines (32,33) are stored, and that the microprocessor produces an input signal corresponding to the sine of the pivot angle of the lens holder (27), which sine is equal to the ratio formed from the longitudinal displacement of the picture holder (14') and from a stored spacing of a measuring line (V).

* * * * *